United States Patent Office 2,996,208
Patented Aug. 15, 1961

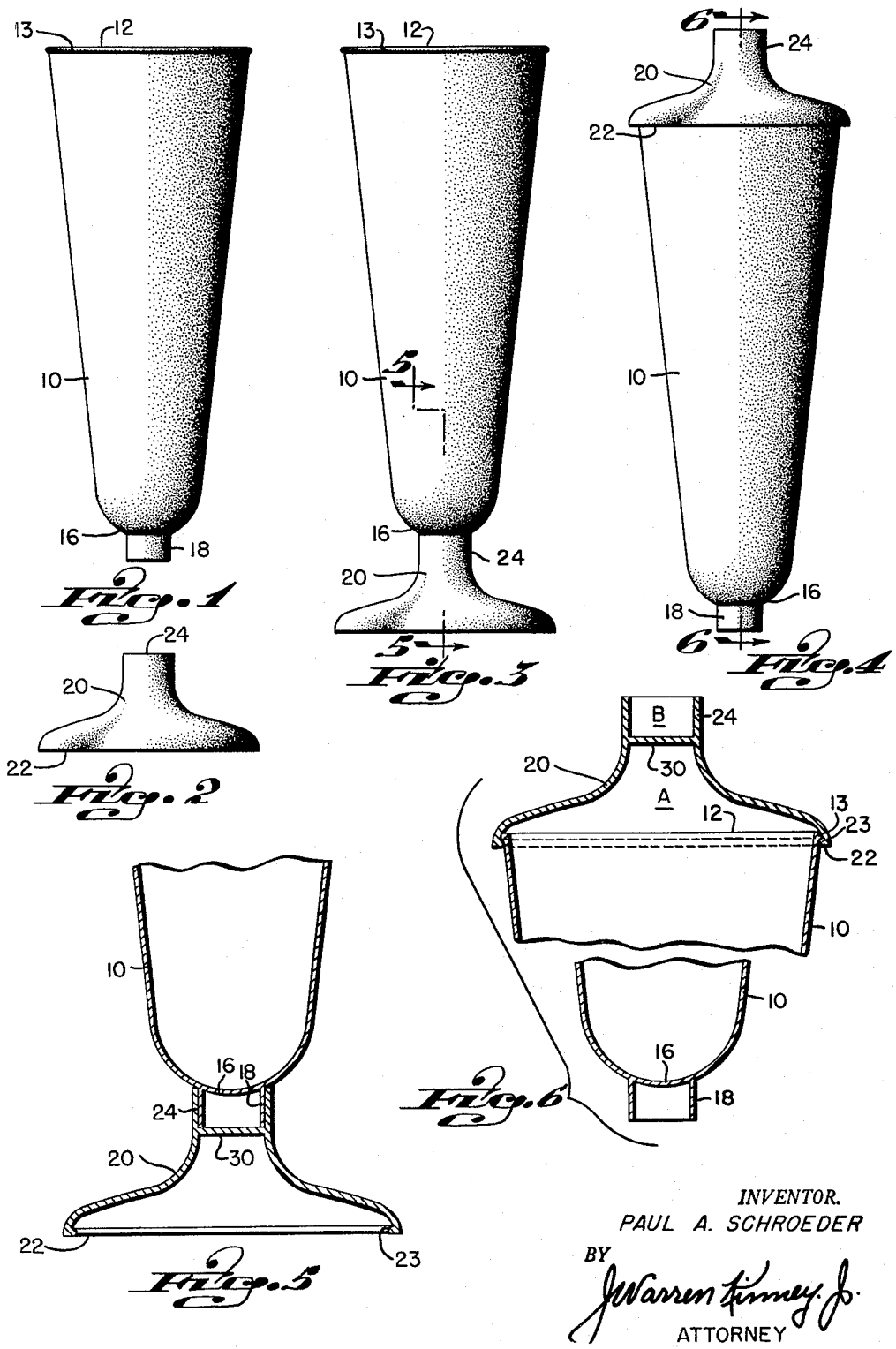

2,996,208
RECEPTACLE
Paul A. Schroeder, Cincinnati, Ohio, assignor to Plastic Specialties, Inc., Cincinnati, Ohio, a corporation of Ohio
Filed Mar. 14, 1960, Ser. No. 14,890
2 Claims. (Cl. 215—99.5)

This invention relates to a container, and more particularly to a container that is adapted to house its contents for enabling the same to be dispensed in a sanitary, completely enclosed condition and which, after being dispensed, is adapted to be opened whereby the closure member may be associated with the opposite end of the container as a support or stand therefor.

An object of the invention is to provide a container having the hereinabove described characteristics wherein the container and its combination closure member and base are fabricated from plastic.

These and other objects are attained by the means described herein and as disclosed in the accompanying drawings, in which:

FIG. 1 is a side elevational view of the receptacle portion of the invention.

FIG. 2 is a side elevational view of the combination closure member and support base embodying the teachings of the invention.

FIG. 3 is a side elevational view illustrating the receptacle of FIG. 1 supported on the base member of FIG. 2.

FIG. 4 is a view similar to FIG. 3, illustrating the receptacle of FIG. 1 closed by the closure member of FIG. 2.

FIG. 5 is a sectional view taken on line 5—5 of FIG. 3.

FIG. 6 is a fragmentary sectional view taken on line 6—6 of FIG. 4.

With particular reference now to the drawings, the numeral 10 denotes generally a receptacle which in the preferred embodiment of the invention is fabricated from inexpensive material, such as, by way of example, plastic, whereby to provide a device that is inexpensive enough to be given away with a purchase of its contents. The receptacle includes side walls which converge downwardly from an upper open end 12 to a closed bottom 16 which terminates in a downwardly projecting plug 18. As best illustrated in FIGS. 1, 3, and 6, the upper peripheral edge 12 is provided with an overhang or outwardly projecting, continuous lip or bead 13.

With particular reference now to FIGS. 2 and 5, it will be noted that the numeral 20 denotes generally a combination closure member and base which is fabricated from plastic like receptacle 10. Member 20 includes an open lower end 22 dimensioned to be received onto and over the upper open end 12 of receptacle 10. The lower end 22 is provided with an inturned or inwardly projecting, continuous bead 23, as best illustrated in FIGS. 5 and 6, which is adapted to snap over the outwardly projecting lip 13 of the receptacle, as illustrated in FIGS. 4 and 6 for thereby securely though releasably affixing the cover member to the upper open end of the receptacle. It should be understood that when the cover member is thus associated with the top of the receptacle, the contents of the receptacle will be completely enclosed and housed against spilling or contamination.

The other end of the base element 20 terminates in a socket 24 which is dimensioned to receive plug portion 18 of the receptacle for disposing the receptacle in the base-supported position illustrated in FIGS. 3 and 5.

The numeral 30 denotes a barrier element which completely isolates the lower open portion A from the socket portion B.

From the foregoing, it will be noted that I have thus provided simple yet highly effective means for enabling articles such as, by way of example, ice cream products and the like, to be readily dispensed to the consuming public in such a manner that they might be conveniently transported with the contents thereof completely housed against spilling or contamination. When the cover member has been removed incident to the receptacle being opened by the customer, it may be quickly, easily, and effectively associated with plug 18, whereby the receptacle will be supported as in FIG. 3 for enabling its contents to be easily removed.

It should be understood that various changes and modifications may be made in the structural details of the device within the scope of the appended claims, without departing from the spirit of the invention.

What is claimed is:

1. A container and combination closure member and base therefor, said container being elongated and having a wide opening at the top with a gradually inwardly converging continuous side wall terminating in a convex shaped bottom for utilizing the full length of the container and the contents therein to provide a low center of gravity therefor, a cylindrical plug depending from the central portion of said convex shaped bottom having a lower end adapted to receive said base for supporting said container thereon, said closure member comprising an inverted dish shaped portion with a cylindrical socket extending centrally thereabove adapted to fit over the opening in the top of said container to form a closure therefor, and said cylindrical socket being adapted to fit over said plug when said dish shaped portion is used as a base for the container, said plug having an outer diameter slightly less than the inner diameter of the socket to frictionally and releasably engage said socket.

2. The container of claim 1 wherein the opening has an outwardly projecting lip member disposed around its perimeter, and said inverted dish shaped portion has an inwardly projecting bead member adapted to snap over said lip member to releasably secure dish portion to said container.

References Cited in the file of this patent

UNITED STATES PATENTS

| | | |
|---|---|---|
| 648,436 | Rider | May 1, 1900 |
| 2,700,249 | Miller | Jan. 25, 1955 |
| 2,904,204 | Naphtal et al. | Sept. 15, 1959 |
| 2,918,188 | Todd | Dec. 22, 1959 |